(12) United States Patent
Yamamoto et al.

(10) Patent No.: US 11,654,828 B2
(45) Date of Patent: May 23, 2023

(54) ALERT OUTPUT APPARATUS

(71) Applicant: DENSO CORPORATION, Kariya (JP)

(72) Inventors: Masayuki Yamamoto, Kariya (JP); Katsushi Asami, Kariya (JP); Daisuke Kaji, Kariya (JP); Yuya Hattori, Kariya (JP)

(73) Assignee: DENSO CORPORATION, Kariya (JP)

( * ) Notice: Subject to any disclaimer, the term of this patent is extended or adjusted under 35 U.S.C. 154(b) by 1552 days.

(21) Appl. No.: 15/567,810

(22) PCT Filed: May 13, 2016

(86) PCT No.: PCT/JP2016/002356
§ 371 (c)(1),
(2) Date: Oct. 19, 2017

(87) PCT Pub. No.: WO2016/208115
PCT Pub. Date: Dec. 29, 2016

(65) Prior Publication Data
US 2018/0107946 A1 Apr. 19, 2018

(30) Foreign Application Priority Data

Jun. 22, 2015 (JP) .............................. JP2015-124609

(51) Int. Cl.
*G06N 20/00* (2019.01)
*G06N 5/04* (2023.01)
(Continued)

(52) U.S. Cl.
CPC ............... *B60Q 9/008* (2013.01); *G06N 5/04* (2013.01); *G06N 20/00* (2019.01); *G07C 5/00* (2013.01);
(Continued)

(58) Field of Classification Search
CPC .......... G07C 5/085; G07C 5/00; G07C 5/008; B60Q 9/008; G08G 1/166; G08G 1/16;
(Continued)

(56) References Cited

U.S. PATENT DOCUMENTS

2015/0170515 A1* 6/2015 Annapureddy et al. .....................
G08G 1/0967

FOREIGN PATENT DOCUMENTS

JP 2014-048732 A 3/2014
JP 2014-137682 A 7/2014

OTHER PUBLICATIONS

Gijs Slijpen, "Machine to Machine Perception for Safer Traffic," Master Project, University of Groningen, The Netherlands, Jan. 2013 (Year: 2013).*

* cited by examiner

*Primary Examiner* — Viker A Lamardo
(74) *Attorney, Agent, or Firm* — Maschoff Brennan

(57) ABSTRACT

From each of in-vehicle units in vehicles, a travel behavior data indicating a travel behavior of the vehicle is received and recorded in a travel history database. The travel behavior data of the vehicles are read from the travel history database; an avoidance action arising in each of the vehicles is detected based on the read travel behavior data. From the detected avoidance actions of the vehicles, a related avoidance action group being avoidance actions arising due to an identical object at different positions at different points of times in different target vehicles is extracted based on an occurrence position and an occurrence point of time of each detected avoidance action. Information on position change of the identical object as a cause of the extracted related avoidance action group is recorded as an alert target data.

5 Claims, 8 Drawing Sheets

(51) Int. Cl.
*B60Q 9/00* (2006.01)
*G07C 5/00* (2006.01)
*G08G 1/01* (2006.01)
*G08G 1/16* (2006.01)
*G07C 5/08* (2006.01)
*B60R 21/00* (2006.01)

(52) U.S. Cl.
CPC .............. *G07C 5/008* (2013.01); *G07C 5/085* (2013.01); *G08G 1/0112* (2013.01); *G08G 1/0129* (2013.01); *G08G 1/164* (2013.01); *G08G 1/166* (2013.01); *B60R 21/00* (2013.01)

(58) Field of Classification Search
CPC .... G08G 1/0129; G08G 1/0112; G08G 1/164; G06N 5/04; G06N 20/00; B60R 21/00
See application file for complete search history.

ALERT OUTPUT APPARATUS

CROSS REFERENCE TO RELATED APPLICATION

The present application is based on Japanese Patent Application No. 2015-124609 filed on Jun. 22, 2015, the disclosure of which is incorporated herein by reference.

TECHNICAL FIELD

The present disclosure relates to an alert output apparatus.

BACKGROUND ART

Patent literature 1 discloses an alert output apparatus that estimates a dangerous spot by analyzing actual travel history data of a plurality of vehicles and transmits the alert information to users. This alert output apparatus performs a determination of whether a determination target point is a dangerous spot based on the travel history data, registers the determination target point as a dangerous spot when the determination is made affirmative, and transmits the alert information when a vehicle runs just before the dangerous spot. This alert output apparatus regards the determination target point as a spot of which the latitude and longitude are fixed.

PRIOR ART LITERATURES

Patent Literature

Patent literature 1: JP 2014-137682 A

SUMMARY OF INVENTION

However, the inventors' study teaches that an alert target that drivers need to pay attention to is not only a fixed spot but also a moving object.

It is an object of the present disclosure to record a single moving object as a single alert target object.

To achieve the above object, according to an aspect of the present disclosure, an alert output apparatus is provided to include a reception recorder section, an avoidance detector section, an extractor, and a recorder section. The reception recorder section receives, from each of a plurality of in-vehicle units mounted individually in a plurality of vehicles, a travel behavior data indicating a travel behavior of the vehicle in which each of the in-vehicle units is mounted, and record the travel behavior data in a travel history database. The avoidance detector section reads a travel behavior data indicating a travel behavior of each of the vehicles and tries to detect an avoidance action arising in each of the vehicles based on the read travel behavior data. The extractor section extracts, from the avoidance actions of the vehicles detected by the avoidance detector section, a related avoidance action group being a plurality of avoidance actions arising due to an identical object at different positions at different points of times in different target vehicles included in the plurality of vehicles, based on an occurrence position and an occurrence point of time of each of the avoidance actions of the vehicles detected by the avoidance detector section. The recorder section records information on a position change of the identical object that serves as a cause of the related avoidance action group extracted by the extractor section, as an alert target data indicating a position change of an alert target object in an alert target database.

As such, an alert output apparatus records a related avoidance action group that are a plurality of avoidance actions arising at different positions at different points of times as the information on a position change of an identical object in an alert target database. Such a configuration allows recording a single moving object as a single alert target object.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
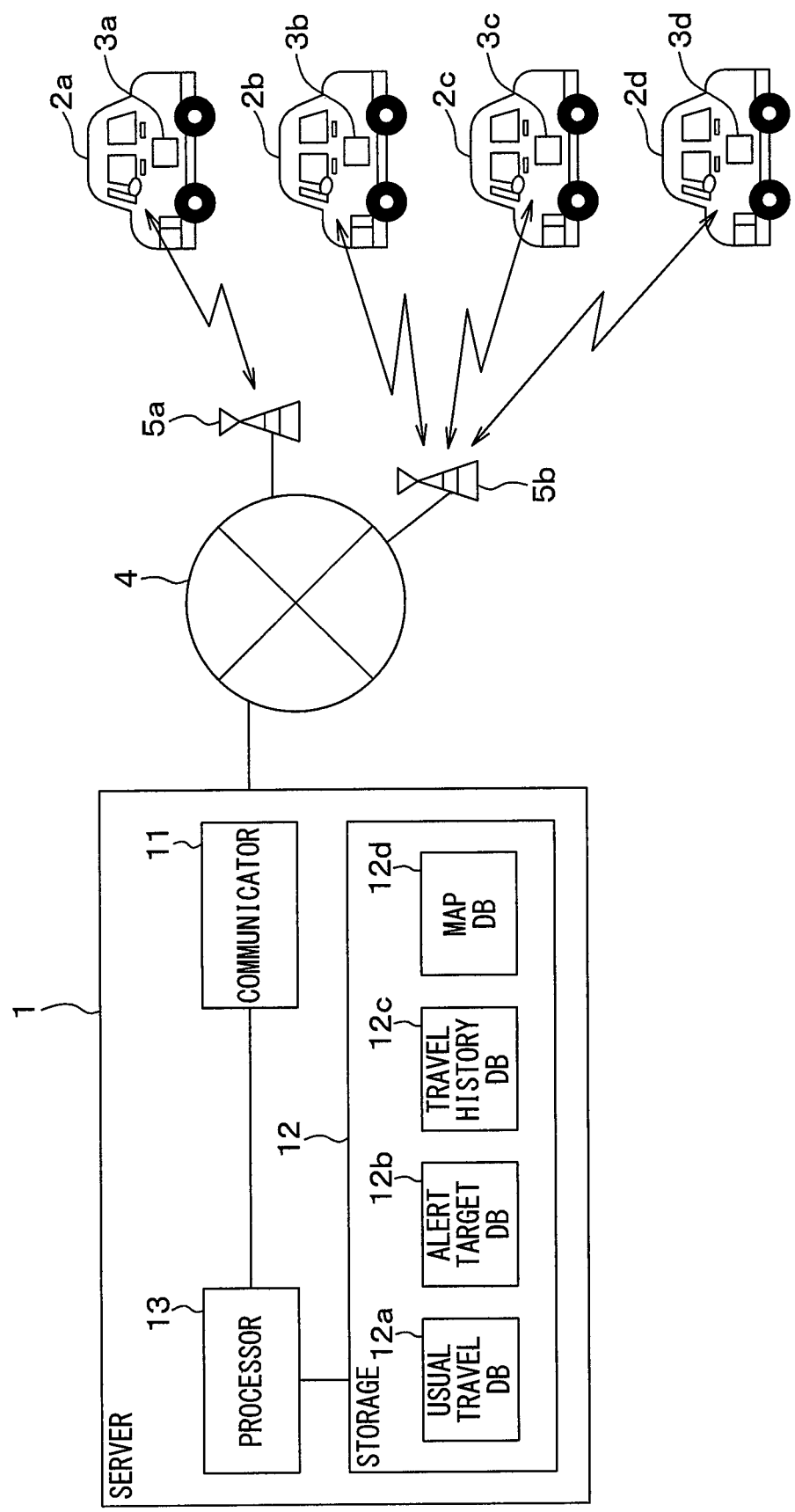
FIG. 1 is a diagram illustrating an overall configuration of an alert output system according to a first embodiment.

The following describes a first embodiment of the present disclosure. As indicated in FIG. 1, an alert output system according to the present embodiment includes a server 1 and a plurality of in-vehicle units 3a, 3b, 3c, and 3d. The in-vehicle units 3a, 3b, 3c, and 3d are mounted individually in vehicles 2a, 2b, 2c, and 2d. These vehicles may be each also referred to as a mounting vehicle or a host vehicle. The server 1 is configured to communicate with the in-vehicle units 3a to 3d via a communication network 4 (for example, the Internet) and wireless base stations 5a and 5b.

The server 1, which is equivalent to an example of an alert output apparatus, includes a communicator part 11, a storage part 12, and a processor part 13. The communicator part 11 is a known communication interface for connecting with a communication network 4.

The storage part 12, which is a storage media for recording the various data, includes a RAM, a ROM, and a rewritable nonvolatile storage medium such as a flash memory. In addition, such a rewritable nonvolatile storage medium contains a usual travel DB 12a, an alert target DB 12b, a travel history DB 12c, and a map DB 12d. The "DB" is an abbreviation for database. In the present embodiment, the usual travel DB 12a, the alert target DB 12b, the travel history DB 12c, and the map DB 12d each correspond to a storage area of the rewritable nonvolatile storage medium. The processor part 13 is a CPU that performs various calculation processes and control processes.

Figure 2:
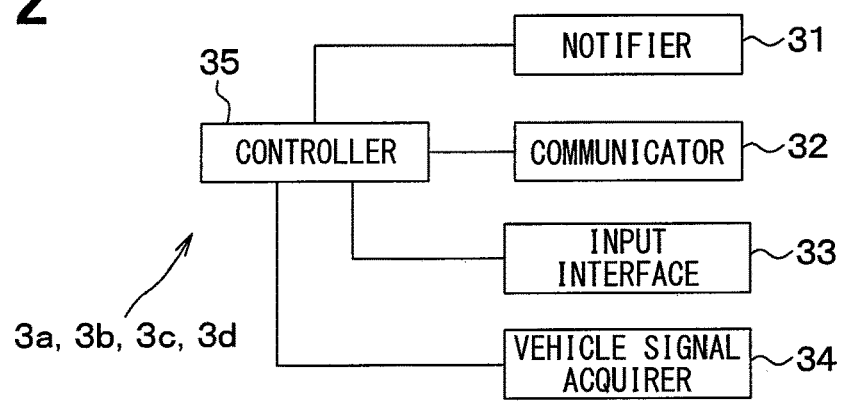
FIG. 2 is a diagram illustrating a configuration of an in-vehicle unit.

As illustrated in FIG. 2, the in-vehicle units 3a to 3d have individually identical configurations. In detail, each of the in-vehicle units 3a to 3d has a notifier part 31, a communicator part 32, an input interface part 33, a vehicle signal acquirer part 34, and a controller part 35.

The notifier part 31 includes an image display apparatus that displays images allowing the driver of the host vehicle to see, and a sound output apparatus that outputs sounds allowing the driver of the host vehicle to hear.

The communicator part 32 is a known wireless communication interface for wirelessly connecting with either of base stations 5a and 5b. The input interface part 33 is a member (such as a steering switch, a speech input apparatus) which receives an input action (such as a switch manipulation input, a speech input) by the driver of the host vehicle.

The vehicle signal acquirer part 34 is an apparatus that acquires the information about travel behaviors of the host vehicle from different in-vehicle units connected to an in-vehicle LAN of the host vehicle. Such different in-vehicle units include an ECU such as a navigation ECU, which identifies a latitude and longitude of a current position of the host vehicle using a GPS receiver. The different in-vehicle units further include an ECU such as a body ECU, which receives detection signals from a speed sensor, an acceleration sensor, or a steering angle sensor, identifying a vehicle speed, a steering angle, etc., of the host vehicle based on the received detection signals. Note that "information" may be used not only as an uncountable noun but also a countable noun; a plurality of informations is equivalent to a plurality of information items. In addition, "data" may be used not only as in a singular form or a plural form; the data is used as being equivalent to a single data item or a plurality of data items.

The controller part 35 may be also referred to as an electronic control unit or a controller. In the present embodiment, for instance, the controller part 35 includes a CPU, RAM, ROM, etc.; in the controller part 35, the CPU executes programs recorded in the ROM while using the RAM as a work memory. The following explains on the assumption that processes executed by the CPU are processes executed by the controller part 35. Note that a part or all the parts of each process by the controller part 35 may be also achieved by a hardware circuit.

The following explains an operation of the alert output system having the above configuration. First, the controller part 35 of each of the in-vehicle units 3a to 3d executes the program recorded in the ROM, thereby executing the process illustrated in FIG. 3 repeatedly with cycles (for example, a cycle of one second).

It is further noted that described flowcharts include sections (also referred to as S), each of which is represented, for instance, as S110. Further, each section can be divided into several sections while several sections can be combined into a single section. Each section may be referred to as a device, a module, or a specific name; for instance, a detection section may be referred to as a detection device, a detection module, or a detector. Further, each section can be achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

Figure 3:
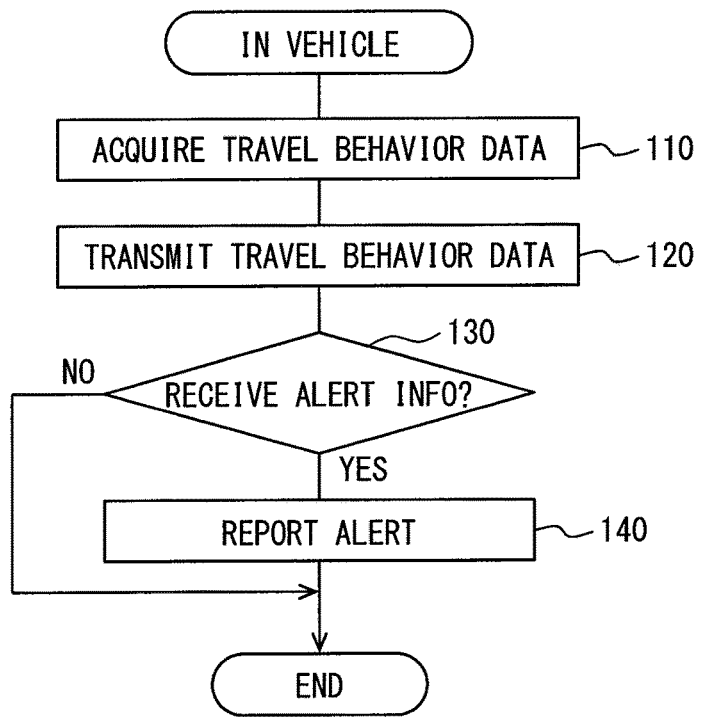
FIG. 3 is a flowchart of a process performed by a controller part of an in-vehicle unit.

In the process of FIG. 3, at S110, the controller part 35 acquires travel behavior data using the vehicle signal acquirer part 34. The travel behavior data are data indicating a travel behavior of the host vehicle. The acquired travel behavior data include data such as a current position, a steering angle of the steering wheel, and a speed of the host vehicle periodically transmitted via the LAN from the ECUs mentioned above. In addition, the travel behavior data acquired by the controller part 35 at S110 in FIG. 3 at the present cycle are the travel behavior data acquired by the vehicle signal acquirer part 34 from when S110 in FIG. 3 at the previous cycle was completed up to the present time.

At subsequent S120, the travel behavior data acquired at previous S110 are transmitted to the server 1 using the communicator part 32. The travel behavior data additionally include a vehicle ID for distinguishing the host vehicle from other vehicles, and an acquisition date and time that is a date and time at which the travel behavior data are acquired.

At subsequent S130, it is determined whether a reception takes place which receives newly the alert information from the server 1 via the communicator part 32 from when S130 in FIG. 3 at the previous cycle is completed up to the present time. When the reception is determined to take place, the sequence advances to S130; when the reception is determined not to take place, the process in FIG. 3 at the present cycle is ended. At S140, an alert report is performed based on the newly received alert information using the notifier part 31. After S140, the process in FIG. 3 at the present cycle is ended.

Figure 4:
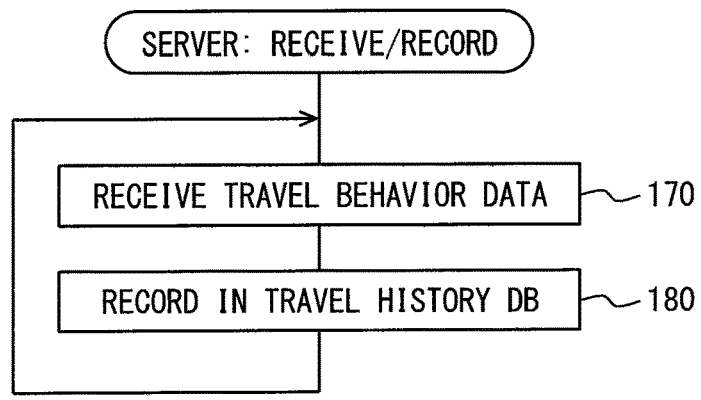
FIG. 4 is a flowchart of a reception record process performed by a server.

The following explains a reception record process performed by the processor part 13 of the server 1 with reference to FIG. 4. The processor part 13 executes the program recorded in the ROM or the flash memory of the storage part, thereby executing the reception record process simultaneously in parallel with another process.

In this reception record process, at S170, the processor part 13 waits for a reception of any travel behavior data from any one of the in-vehicle units 3a to 3d. When receiving the travel behavior data from any one of the in-vehicle units 3a to 3d via the communicator part 11, the sequence advances to S180.

At S180, the travel behavior data received at previous S170 is recorded in the travel history DB 12c. After S180, the sequence returns to S170, and waits for a reception of the travel behavior data again.

Under the above process, each time receiving a single travel behavior data from each of the in-vehicle units 3a to 3d, the processor part 13 of the server 1 adds the received data onto the travel history DB 12c. This allows the travel history DB 12c to accumulate the past travel history data of the vehicles 2a to 2d.

Figure 5:
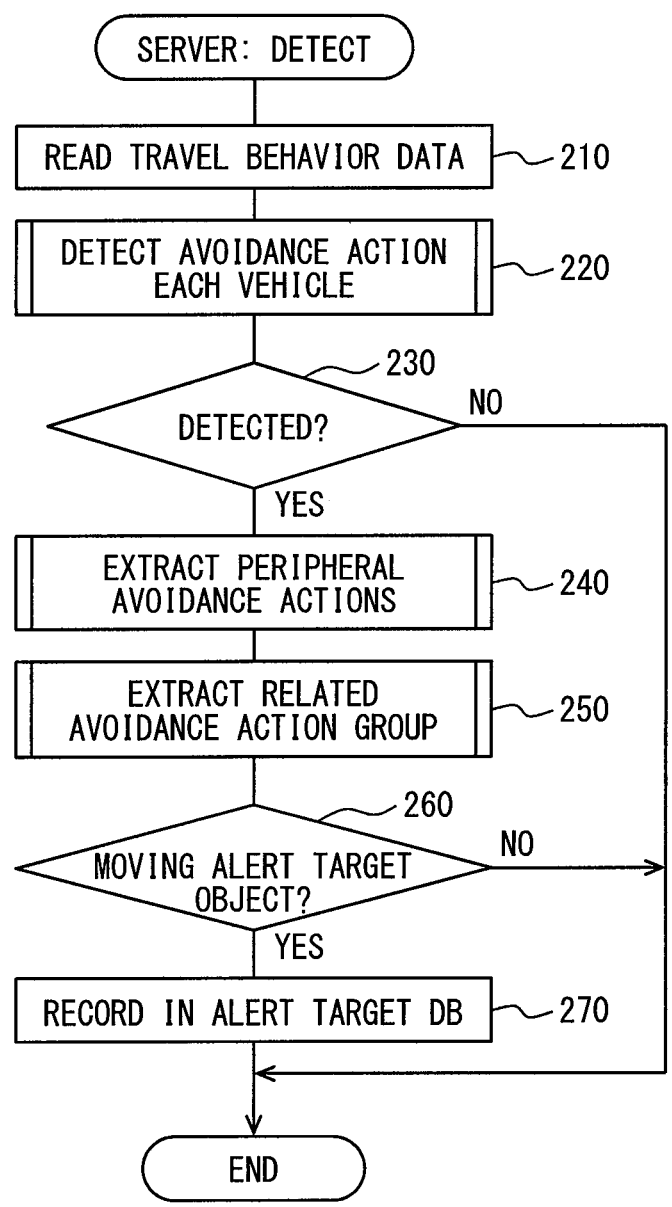
FIG. 5 is a flowchart of a detection process performed by a server.

The following explains a detection process performed by the processor part 13 of the server 1 with reference to FIG. 5. The processor part 13 executes the program recorded in the ROM or the flash memory of the storage part, thereby executing the detection process repeatedly with cycles (e.g., a cycle of one second), simultaneously in parallel with another process.

In the detection process, at S210, the processor part 13 reads the travel history data each of which has an acquisition date and time within a range from a past predetermined point of time (e.g. one minute ago) to the present time among the travel history data recorded in the travel history DB 12*c*.

Figure 6:
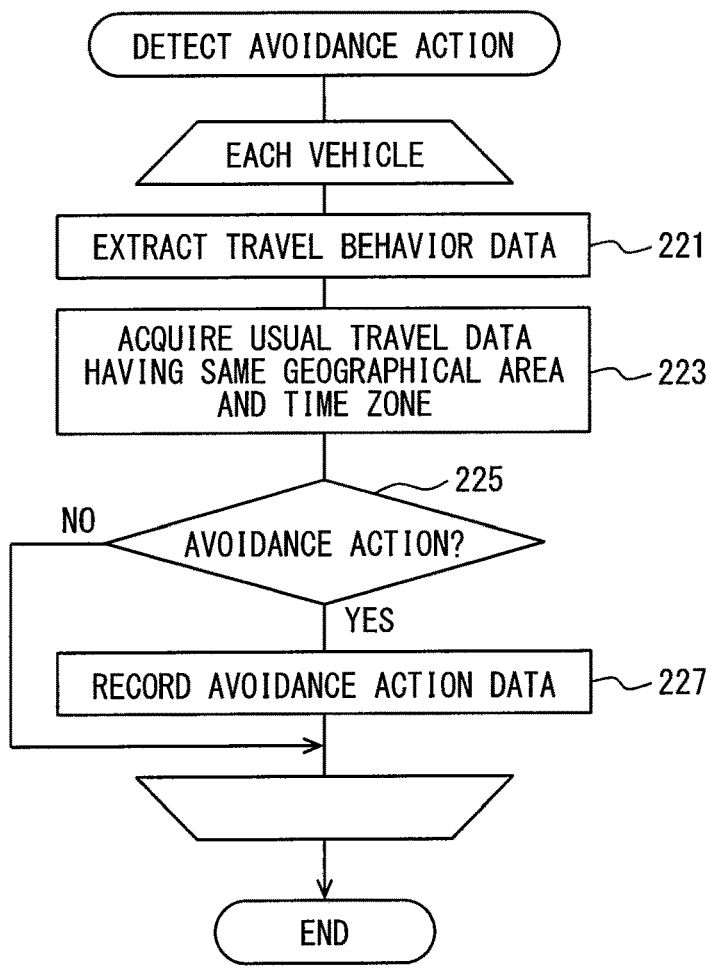
FIG. 6 is a flowchart illustrating in detail a process at S220 in FIG. 5.

Then, at S220, an avoidance action is detected with respect to each of the vehicles. The details of the process at S220 are illustrated in FIG. 6. As illustrated in FIG. 6, the processor part 13 executes a series of processes of S221 to S227 for each of the vehicles 2*a* to 2*d*.

In a series of processes of S221 to S227 for a subject vehicle, at S221, the processor part 13 extracts only all the travel behavior data containing the vehicle ID of the subject vehicle from the travel behavior data read at previous S210.

Then, at subsequent S223, the information on the acquisition date and time and the current position are read from the travel behavior data extracted at previous S221. Then, the day of the week and time zone to which the read acquisition date and time belongs is identified; the same geographical area as the read current position is identified.

Classifying the time zones is predetermined. For example, twelve time zones may be predetermined by classifying 24 hours for each two hours without specifying dates. Classifying the geographical areas is also predetermined. For example, the geographical areas may be classified for regions each having a length of 500 meters along a road. In many cases, a plurality of sets, each of which has one day of the week, one time zone, and one geographical area, are specified.

Furthermore, at S223, a usual vehicle travel data corresponding to the set of a specified day of the week, time zone, and geographical area. The usual travel DB 12*a* contains a plurality of usual vehicle travel data each of which corresponds to one set of the day of the week, the time zone, and the geographical area. Each usual vehicle travel data is a data that indicates a usual vehicle travel behavior of vehicles in the corresponding set of the day of the week, the time zone, and the geographical area.

Figure 7:
FIG. 7 is a diagram illustrating contents of usual vehicle travel data.

For example, as illustrated in FIG. 7, a usual vehicle travel data on a certain straight road is recorded as a data of a position-specific steering angle with respect to each position on the road, the steering angle hardly changing along with the position change on the road. In contrast, a data of a position-specific vehicle speed with respect to each position on a road is included; the position-specific vehicle speed decreases with a constant acceleration from a position 100 meters short of a specified position (for example, a position of a halt line) on the road, and becomes zero at the specified position.

Then, at S225, the travel behavior data extracted at S221 and the usual vehicle travel data acquired at S223 are compared with each other, thereby trying to detect an avoidance action arising on the vehicle. This avoidance action is an action of the driver manipulating the vehicle so as to avoid an obstacle on a road or in proximity of a road.

Figure 8:
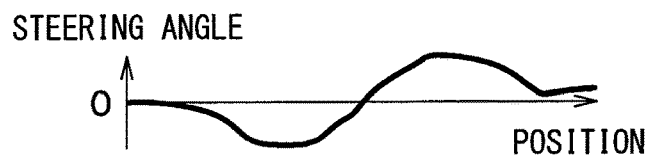
FIG. 8 is a diagram illustrating contents of collected data.

The following explains an example of comparing the position-specific steering angle (refer to FIG. 8) of a travel behavior data identified at S221, and the position-specific steering angle of the usual vehicle travel data extracted at S223 based on the travel behavior data. In this case, a difference is calculated between the position-specific steering angle indicated by the travel behavior data and the position-specific steering angle indicated by the usual vehicle travel data with respect to each position on the road. In a predetermined interval (e.g., not greater than 100 meters), the position exhibiting the maximum and the position exhibiting the minimum are detected in the differences of the position-specific steering angles; then, an absolute value of the difference between the maximum and the minimum is calculated. When the calculated absolute value is equal to or greater than a reference value, an avoidance action of the vehicle is detected to be arising at a position that is a middle point of the line segment which connects the position exhibiting the maximum and the position exhibiting the minimum. By contrast, when the calculated absolute value is not equal to or greater than the reference value, it is determined that any avoidance action of the vehicle is not arising at the middle point.

When an avoidance action is detected at S227, the sequence advances to S227. When any avoidance action is not detected, S227 is bypassed and a series of processes of S221 to S227 about the vehicle is ended.

At S227, the occurrence position and occurrence date and time (equivalent to an example of an occurrence point of time) of the avoidance action detected at S225 is added to the avoidance action data in the RAM. The occurrence date and time is identified based on the acquisition date and time in the travel behavior data of the vehicle in the proximity of the occurrence position so that the occurrence position matches with the current position of the vehicle. After S227, a series of processes of S221 to S227 about the vehicle are ended.

As such, at S220, the occurrence position and occurrence date and time of the avoidance action occurring in the vehicle are recorded in the avoidance action data with respect to each of the vehicles. This allows the successive addition of the occurrence position and occurrence date and time of the avoidance action which occurred in the past in the vehicles 2*a* to 2*d* into the avoidance action data.

Then, at S230, it is determined whether the avoidance action is detected at S220. When it is determined that the avoidance action is detected, the sequence advances to S240. When it is determined that the avoidance action is not determined, the detection process in FIG. 3 at the present cycle is ended.

Figure 9:
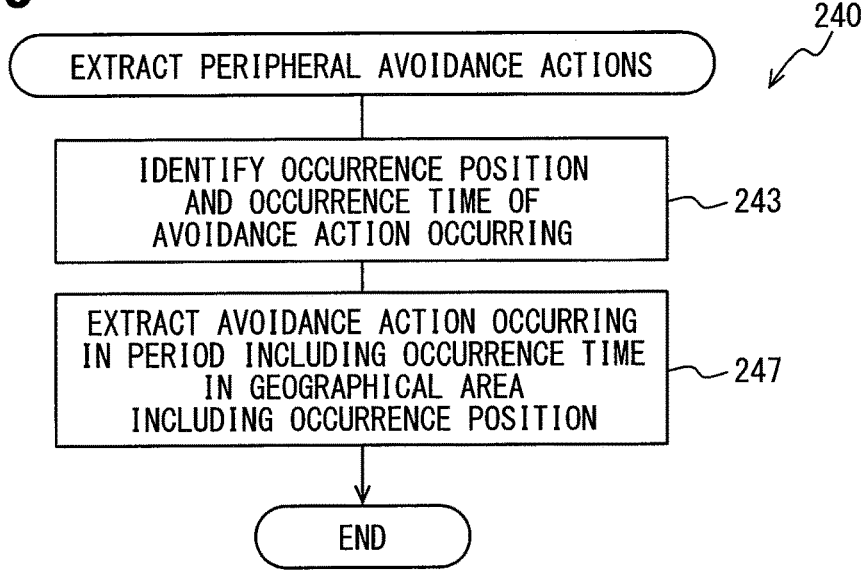
FIG. 9 is a flowchart illustrating in detail a process at S240 in FIG. 5.

At S240, the sets of occurrence positions and occurrence dates and times that correspond to peripheral avoidance actions are extracted from a plurality of sets of occurrence positions and occurrence dates and times included in the avoidance action data. In detail, as illustrated in FIG. 9, at S243, the processor part 13 reads out the set of the occurrence position and the occurrence date and time of the avoidance action recorded in the avoidance action data at previous S220.

At S247, a geographical area including the occurrence position read at previous S243, and a period including the occurrence date and time read at previous S243 are identified. The geographical area is an area within a 100-meter radius centering on the occurrence position read at previous S243. The period is a period within one minute before or after the occurrence time. Further, other than the avoidance action read at S243, peripheral avoidance actions are extracted at S247. The peripheral avoidance action has both (i) the occurrence position that is included in the identified geographical area and (ii) the occurrence date and time, the occurrence time of which is included in the identified period. After S247, the process at S240 is ended.

Figure 10:
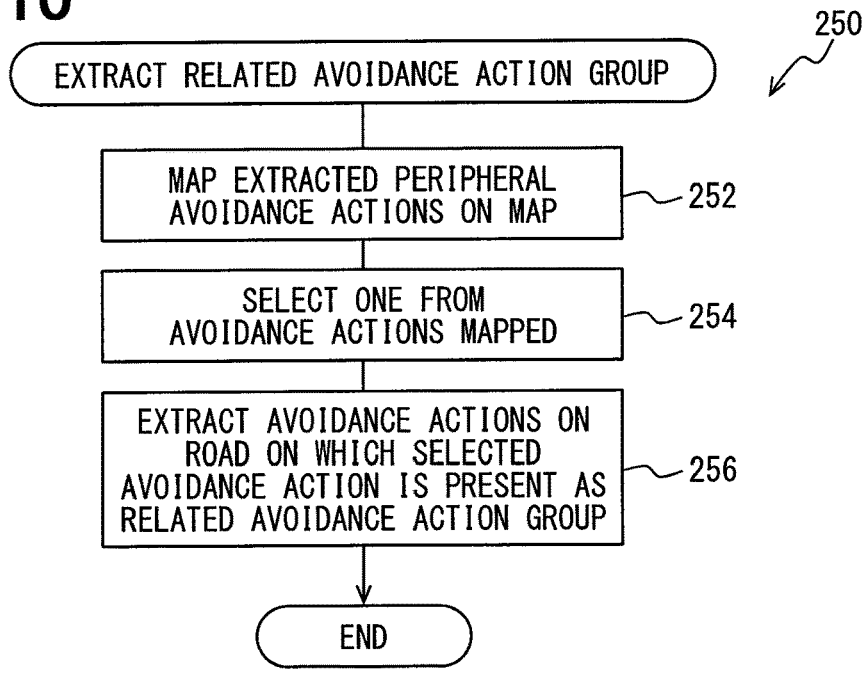
FIG. 10 is a flowchart illustrating in detail a process at S250 in FIG. 5.
Figure 11:
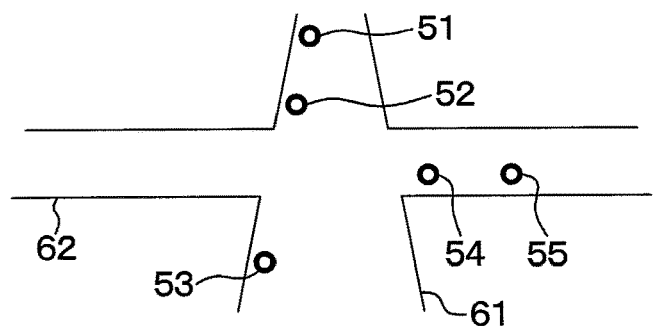
FIG. 11 is a diagram illustrating one step of an extraction process for a group of avoidance actions due to an identical object.

Subsequent to S240, at S250, a related avoidance action group is extracted. The details of the process at S250 are illustrated in FIG. 10. At S252, the processor part 13 maps the peripheral avoidance actions extracted at previous S240 (in detail, at S247) on a road map. In detail, as illustrated in FIG. 11, the respective occurrence positions 51 to 55 of the extracted peripheral avoidance actions are identified in respect of (i) which of the roads 61 and 62 each occurrence position belongs to and (ii) at which position of the road each occurrence position is present. The map DB 12d includes a map data indicating an existence range of each of a plurality of roads; the process of S252 is achieved by using this map data. Note that, in the example in FIG. 11, the road 61 and the road 62 are recorded in the map data as mutually different road intersecting each other.

Figure 12:
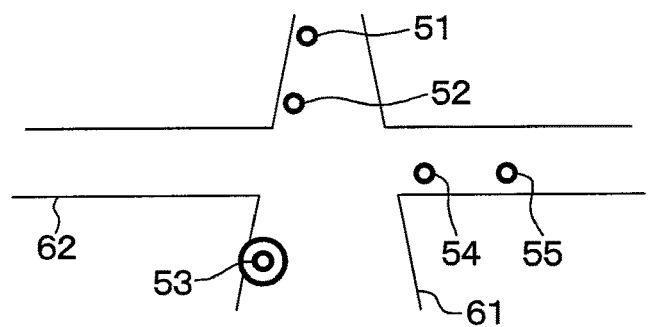
FIG. 12 is a diagram illustrating one step of an extraction process for a group of avoidance actions due to an identical object.

Then, at subsequent S254, one is selected from the peripheral avoidance actions mapped on the map at previous S252. The method of selecting may be random; alternatively, the method of selecting may select an earliest one in the acquisition date and time. In the example of FIG. 12, the avoidance action 53 is selected.

Figure 13:
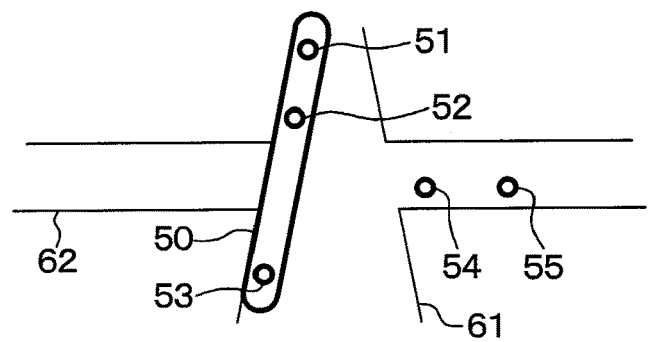
FIG. 13 is a diagram illustrating one step of an extraction process for a group of avoidance actions due to an identical object.

At subsequent S256, all the avoidance actions that are present on the same road as the road where the avoidance action selected at previous S254 belongs are extracted as a related avoidance action group. In the example in FIG. 13, the avoidance actions 51 and 52 belong to the same road 61 as that of the selected avoidance action 53, among the avoidance actions 51 to 55. The avoidance actions 51, 52, and 53 are extracted as a related avoidance action group 50. After S256, the process at S250 is ended.

The extracted related avoidance action group may include, with a high possibility, a plurality of avoidance actions generated in the different vehicles at the different points of times at different positions for the purpose of avoiding an identical object. As an example illustrated in FIGS. 14, 15, and 16, the vehicles 2b, 2c, and 2d (equivalent to an example of a plurality of target vehicles) travel the road 61 in this order; the person 70 (equivalent to an example of an identical object) walks on the road 61 as so to disturb the vehicles.

Figure 14:
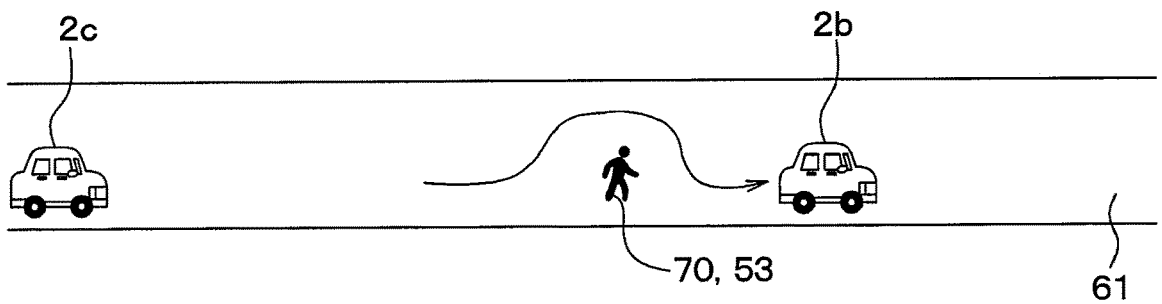
FIG. 14 is a diagram illustrating a state after a vehicle avoids a person.
Figure 15:
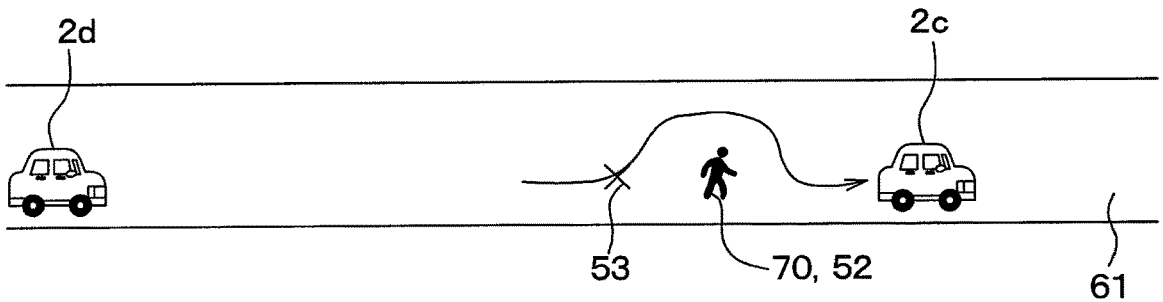
FIG. 15 is a diagram illustrating a state after a vehicle avoids a person.
Figure 16:
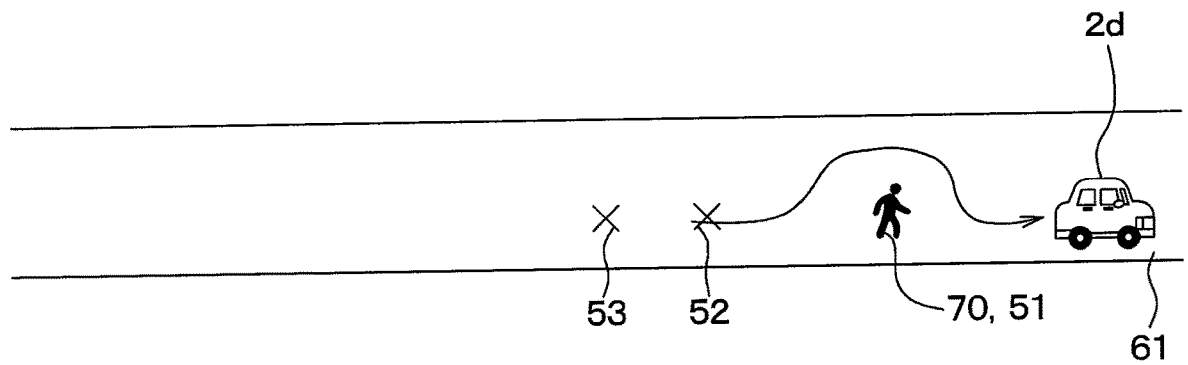
FIG. 16 is a diagram illustrating a state after a vehicle avoids a person.

In this case, first, as illustrated in FIG. 14, when the vehicle 2b avoids and passes the person 70, the occurrence position 53 in the occurrence point of time of the avoidance action is the same as the position of the person 70 at this time. Then, as illustrated in FIG. 15, when the vehicle 2c avoids and passes the person 70, the occurrence position 52 in the occurrence point of time of the avoidance action, which is the same as the position of the person 70 at this time, is moved from the position 53 as the person 70 moves. Then, as illustrated in FIG. 16, when the vehicle 2d avoids and passes the person 70, the occurrence position 51 in the occurrence point of time of the avoidance action, which is the same as the position of the person 70 at this time, is moved from the position 52 as the person 70 moves. Thus, the person 70 causes the avoidance actions to occur in the different vehicles at the different positions at the different points of times.

Subsequent to S250, at S260, it is determined whether the above identical object 70 causing the related avoidance action group 50 is a moving alert target object being moving. In detail, a movement speed of the identical object 70 is calculated based on all the occurrence positions and occurrence dates and times belonging to the related avoidance action group 50. It is then determined whether the calculated movement speed is within a reference range (for example, equal to or greater than 2 km/h and less than 40 km/h). When within the reference range, the identical object 70 is determined to be a moving alert target object, advancing the sequence to S270. When not within the reference range, the identical object 70 is determined not to be a moving alert target object, ending the detection process at the present cycle.

The above extracted related avoidance action group allows the calculation of the movement speed of the identical object 70. For example, in the example of FIGS. 11 to 16, the avoidance action 53 has the occurrence position P53 and the occurrence date and time T53; the avoidance action 52 has the occurrence position P52 and the occurrence date and time T52; and the avoidance action 51 has the occurrence position P51 and the occurrence date and time T51. In this example, the movement speed of an identical object 70 is calculated with an expression as follows: $\{L(P52,P53)/(T52-T53)+L(P51,P52)/(T51-T52)\}/2$, wherein L (P52, P53) is the distance in a straight line (or distance along the road) from the occurrence position P52 to the occurrence position P53; L (P51, P52) is the distance in a straight line (or distance along the road) from the occurrence position P51 to the occurrence position P52.

At S270, the information which illustrates the position change of the object (i.e., the identical object 70 causing the related avoidance action group) determined to be a moving alert target object at S260 is recorded in the alert target DB 12b as the alert target data indicating the position change of the alert target object.

In detail, at S270, the processor part 13 identifies the kind of the alert target object 70 based on the movement speed of the object 70 that is determined to be an alert target object at S260. For example, when the movement speed is not less than 2 km/h and less than 10 km/h, the object 70 is determined to be a person. When the movement speed is not less than 10 km/h, the object 70 is determined to be a bicycle.

In addition, the processor part 13 identifies the movement direction on the road 61 of the alert target object 70. For instance, the movement direction on the road 61 of the alert target object 70 is supposed to be the direction from the position of the first avoidance action to the position of the last avoidance action arising due to the alert target object 70 among the related avoidance action group.

Then, (i) the occurrence position and the occurrence date and time of the last avoidance action among the related avoidance action group occurring due to this alert target object 70, (ii) the movement speed and the movement direction on the road 61 of the alert target object 70, and (iii) the kind of the alert target object 70 are additionally recorded as a single alert target data into the alert target DB 12b. After S270, the detection process at the present cycle is ended.

The above configuration allows the accumulation of the information on the moving alert target object 70 in the alert target DB 12b in the server 1.

Figure 17:
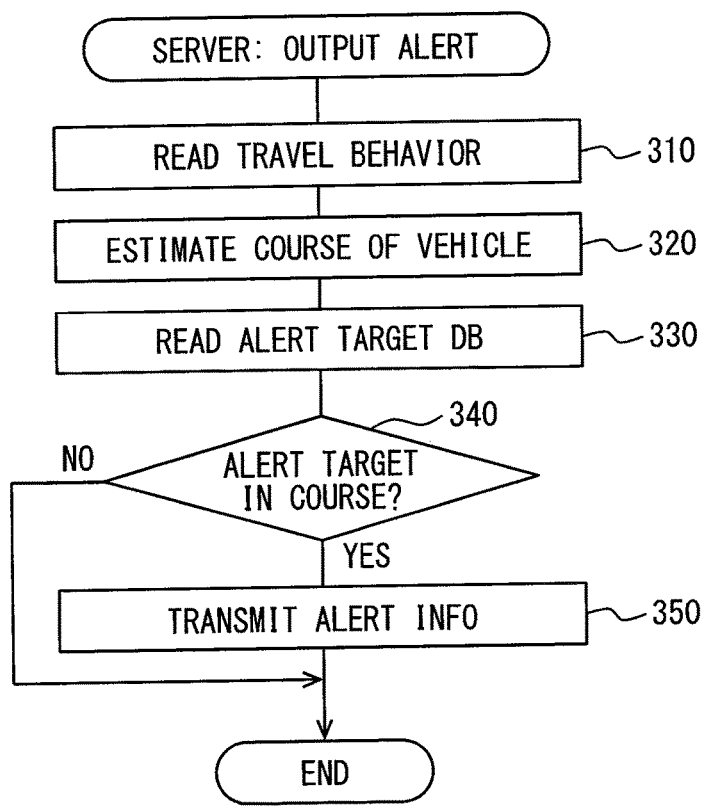
FIG. 17 is a flowchart of an alert output process performed by a server.

The following explains an alert output process performed by the processor part 13 of the server 1 with reference to FIG. 17. The processor part 13 executes the program recorded in the ROM or the flash memory of the storage part, thereby executing the detection process with respect to each of the vehicles repeatedly with cycles (e.g., a cycle of one second), simultaneously in parallel with another process.

The following explains an alert output process for the vehicle 2a (equivalent to an example of a different vehicle), which is the same as the alert output processes for the vehicles 2b to 2d except for the vehicle ID.

At S310, the processor part 13 reads out the data having the acquisition date and time in the past less than one minute from the travel history DB 12*c*, from the travel behavior data having the vehicle ID of the vehicle 2*a*.

At subsequent S320, the course of the vehicle 2*a* after the present time is estimated based on the information on current position of the vehicle 2*a* contained in the travel behavior data read at previous S310. The data of the estimated course includes a plurality of clock times in future, and a plurality of estimated positions of the vehicle 2*a* at the respective clock times. The method of estimating a future course based on the past travel behavior data may use a well-known technology. For example, the vehicle 2*a* running on a road is assumed to further travel along the road with an average speed in the past by one minute in order to estimate a course. At subsequent S330, the alert target data recorded in the alert target DB 12*b* is read.

At subsequent S340, it is determined whether the vehicle 2*a* needs to avoid an alert target object recorded in the alert target DB 12*b*, on the course estimated at S320.

In detail, each alert target object is estimated based on the alert target data in the alert target DB 12*b*, i.e., the occurrence position and occurrence date and time of the last avoidance action arising due to the alert target object 70, and the movement speed and the movement direction on the road 61 of the alert target object 70. For instance, the alert target object is assumed to move the road, which the occurrence position of the last avoidance action belongs to, with the moving speed and the movement direction, in order to estimate a course.

Then, it is determined whether the vehicle 2*a* passes each alert target object based on the course of the vehicle 2*a*, and the estimated course of each alert target object.

When at least one alert target object is determined to be passed, it is determined that the vehicle 2*a* needs to avoid an alert target object recorded in the alert target DB 12*b* on the course of the vehicle 2*a*, advancing the sequence to S350. When any alert target object is determined not to be passed, it is determined that the vehicle 2*a* need not avoid an alert target object recorded in the alert target DB 12*b* on the course of the vehicle 2*a*, ending the alert output process at the present cycle while bypassing S350.

At S350, the alert information based on the information on the alert target object that needs to be avoided is transmitted to the server 1 using the communicator part 11. The information on the alert target object that needs to be avoided is an alert target data of the alert target object determined to be passed by the vehicle 2*a* at S340. After S350, the alert output process at the present cycle is ended.

Upon receiving the alert information via the communicator part 32, the controller part 35 in the in-vehicle unit 3*a* mounted in the vehicle 2*a* determines that the alert information is received at S130 of the above-mentioned process in FIG. 3, advancing the sequence to S140, where the alert report is performed. This alert report allows a report to the driver of the vehicle 2*a* about the contents included in the received information by using an image display apparatus and/or a sound output apparatus of the notifier part 31. The contents to be reported include, for instance, the current position, the movement direction, and the movement speed of the alert target object; and the spot and clock time at which the vehicle is estimated to pass the alert target object.

As explained above, the server 1 receives a travel behavior data indicating a travel behavior of the host vehicle from each of a plurality of in-vehicle units 3*a*, 3*b*, 3*c*, and 3*d* mounted individually in a plurality of host vehicles 2*a*, 2*b*, 2*c*, and 2*d*, and records the received data in the travel history DB 12*c*.

The server 1 reads out a travel behavior data indicating a travel behavior of each of the vehicles 2*a* to 2*d* from the travel history DB 12*c*, and tries to detect an avoidance action arising in each of the vehicles based on the read travel behavior data.

The server 1 further extracts, from the successfully detected avoidance actions of the vehicles 2*a* to 2*d*, a related avoidance action group being a plurality of avoidance actions arising due to an identical object at different positions at different points of times in different vehicles based on the occurrence positions and the occurrence points of times of the avoidance actions.

The server 1 further records, in the alert target DB 12*b*, the information on a position change of the identical object that serves as a cause of the extracted related avoidance action group as an alert target data indicating a position change of an alert target object.

As such, the server 1 records a related avoidance action group that are a plurality of avoidance actions arising at different positions at different points of times as the information on a position change of an identical object in an alert target database. Such a configuration allows recording a single moving object as a single alert target object.

The server 1 further estimates the course of a different vehicle 2*a* other than the vehicles 2*b*, 2*c*, and 2*d* based on the data indicating a travel behavior of the different vehicle 2*a*, and determines whether the different vehicle 2*a* needs to avoid the alert target object based on the estimated course and the alert target data. In response to determining that the different vehicle 2*a* needs to avoid the alert target object, the server 1 transmits, to the different vehicle 2*a*, the alert information based on the information on the alert target object that needs to be avoided. Such a configuration can notify a vehicle of a single object that is moving as a single alert target object, instead of as a plurality of alert target objects.

The server 1 further extracts a related avoidance action group from the detected avoidance actions of each of the vehicles; the related avoidance action group is a group of avoidance actions that occur within a predetermined position range, within a predetermined time range, and on an identical road. Such a configuration allows the extraction of a related avoidance action group with a higher accuracy.

The server 1 further reads out a usual vehicle travel data that indicates a usual vehicle travel behavior from the usual travel database 12*a*, and detects an avoidance action occurring on a vehicle by comparing the read usual vehicle travel data with the travel behavior of the vehicle. This allows the detection of an avoidance action with a high accuracy as compared with the case not using the usual vehicle travel data.

Second Embodiment

The following describes a second embodiment of the present disclosure. An alert output system according to the present embodiment is different from the first embodiment as follows. The controller part 35 of each of the in-vehicle units 3*a* to 3*d* performs a process in FIG. 18 as well as the process in FIG. 3; the processor part 13 of the server 1 further performs a report reception process in FIG. 19. Other configurations or operations are the same as those of the first embodiment.

Figure 18:
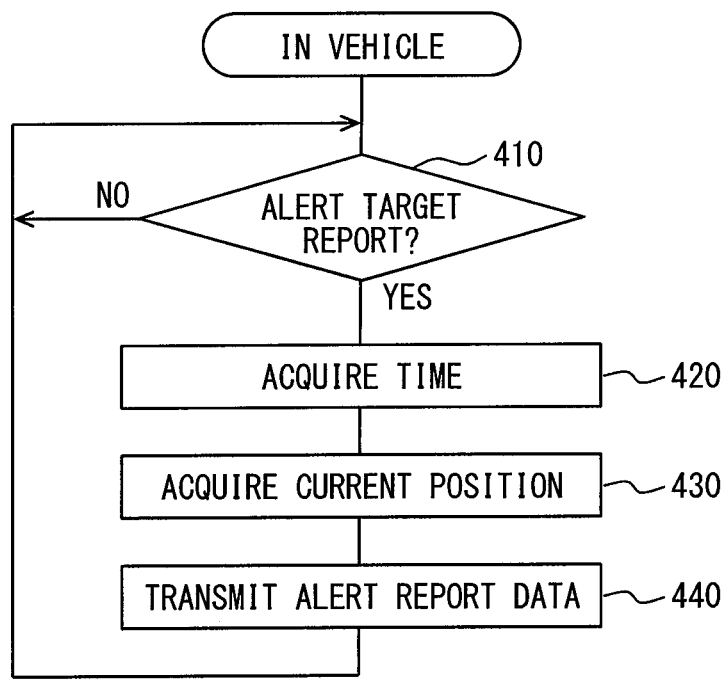
FIG. 18 is a flowchart of a process performed by an in-vehicle unit according to a second embodiment.

The following describes a process in FIG. 18. The controller part 35 of each of the in-vehicle units 3*a* to 3*d* performs a process in FIG. 18 concurrently with the process in FIG. 3.

At S410, the controller part 35 determines repeatedly whether an alert target report newly occurs until determining that an alert target report occurs. The alert target report is an input action by the driver of the host vehicle in order to intentionally report a moving alert target object. For example, an alert target report corresponds to an action manipulating a predetermined report switch among the steering switches of the input interface part 33. in addition, an alert target report corresponds to an action uttering a speech of "find a moving object" so as to input to the input interface part 33.

When it is determined that the alert target report occurs newly, the sequence advances to S430. At S430, a present clock time is acquired; then, at S430, a current position of the host vehicle of the in-vehicle unit is acquired via the vehicle signal acquirer part 34. This current position is the position in proximity of the moving object.

At subsequent S440, the alert report data is transmitted to the server 1 using the communicator part 32. This alert report data contains the present clock time acquired at S420 and the current position acquired at S430. After S440, the sequence returns to S410.

Under such a configuration, each of the in-vehicle units 3a to 3d transmits the alert report data to the server 1 in response to the input action conducted by the driver of the host vehicle, the input action being used to intentionally report an alert target object that is moving.

Figure 19:
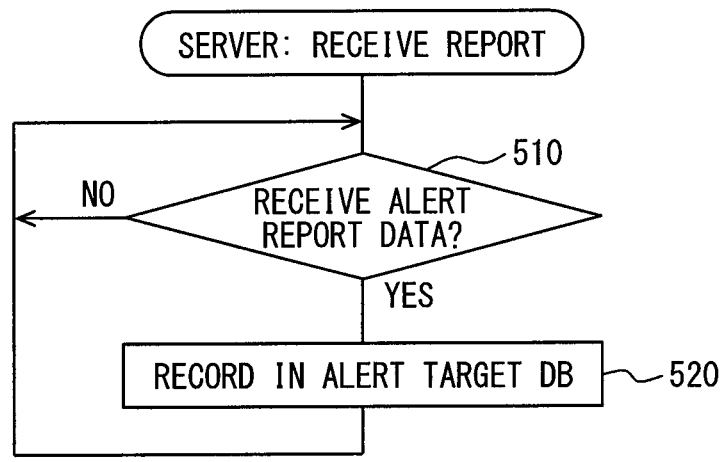
FIG. 19 is a flowchart of a report reception process performed by a server.

In the server 1, the processor part 13 executes the determination process at S510 repeatedly until determining that an alert report data is newly received under the report reception process illustrated in FIG. 19. When determining that an alert report data is received, the sequence advances to S520, where the processor part 13 records a position change of the alert target object in the alert target DB 12b based on the contents of the received alert report data.

The alert target data recorded at S520 has the same data format as that of the alert target data recorded at S270 in FIG. 5. In more detail, at S520, the processor part 13 adopts the current position and the present clock time which are contained in the alert report data received at S510 as the occurrence position and the occurrence date and time in the avoidance action of the recorded alert target data, respectively. Further, the movement speed and the movement direction on the road of the alert target object adopt predetermined fixed values (for example, 1 km/h and the northern direction along the road), respectively. In addition, the kind of the alert target object adopts a predetermined fixed value (for example, a person). The alert target data recorded as above is used similarly to the alert target data recorded at S270 in FIG. 5, without being distinguished from the alert target data recorded at S270.

As such, the server 1 receives an alert report data including the information on position and clock time from any one of the plurality of vehicles, while simultaneously recording in the alert target DB 12b an alert target data indicating a position change of an alert target object based on the received alert report data. Such a configuration allows recording a single moving object as a single alert target object in a more direct procedure.

Note that in the above embodiments, the processor part 13 of the server 1 functions as an example of the reception recorder section or the reception recorder by executing S170 and S180, as an example of the avoidance detector section or the avoidance detector by executing S220, as an example of the extractor section or the extractor by executing S250, as an example of the alert target storage section or the alert target recorder by executing S270 and S520, as an example of the determiner section or the determiner by executing S320, S330, and S340, and as an example of the transmitter section or the transmitter by executing S350.

Other Embodiments

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

In addition, in above each embodiment, a constituent element is not necessarily indispensable, unless otherwise explicitly indicated or believed to be indispensable theoretically. In addition, in above each embodiment, numerical values such as the number of constituent elements, an amount, numerical value, or range of each constituent element, the constituent elements are not necessarily limited to a specified numerical value, unless otherwise explicitly indicated or theoretically limited to the specified numerical number. In the case where a certain amount is exemplified as any one of several values, a value between the several values may be adopted, unless otherwise particularly negated or theoretically impossible. In addition, in above each embodiment, when describing features such as shapes or positional relation of constituent elements, the constituent elements are not always limited to the described features, unless otherwise explicitly indicated or theoretically limited. In addition, the present disclosure may include the following modification examples. Each of the modification examples may be adopted or not adopted to above each embodiment. That is, a predetermined combination of the modification examples may be adopted to above each embodiment. Note that in above each embodiment, a storage media and memory each are a non-transitory tangible storage media.

FIRST MODIFICATION EXAMPLE

In above each embodiment, the alert output apparatus, which is described as being achieved by a single server 1, may be also achieved by a plurality of servers (that is, cloud) which communicate each other.

SECOND MODIFICATION EXAMPLE

In above each embodiment, each of the number of the vehicles and the number of in-vehicle units, which is described as being four, may be more than four.

The invention claimed is:
1. An alert output apparatus comprising:
at least one memory; and
at least one processor communicably coupled to the memory,
wherein the processor is configured to:
receive, from each of a plurality of in-vehicle units mounted individually in a plurality of vehicles, a travel behavior data indicating a travel behavior of the vehicle in which each of the in-vehicle units is mounted, to record the travel behavior data in a travel history database;

read a travel behavior data indicating a travel behavior of each of the vehicles to detect an avoidance action arising in each of the vehicles based on the read travel behavior data;

extract, from the avoidance actions of the vehicles, peripheral avoidance actions that arise within a predetermined position range within a predetermined time range based on an occurrence position and an occurrence point of time of each of the avoidance actions of the vehicles;

map the extracted peripheral avoidance actions on a road map to extract a group of avoidance actions that arise on an identical road based on the peripheral avoidance actions mapped on the road map as a related avoidance action group being a plurality of avoidance actions arising due to an identical object at different positions at different points of times in different target vehicles included in the plurality of vehicles; and record information on a position change of the identical object that serves as a cause of the extracted related avoidance action group, as an alert target data indicating a position change of an alert target object in an alert target database.

2. The alert output apparatus according to claim 1, wherein the processor is further configured to:

estimate a course of a different vehicle other than the target vehicles among the plurality of vehicles based on the travel behavior of the different vehicle;

determine whether the different vehicle needs to avoid the alert target object based on the estimated course and the alert target data; and transmit alert information based on information on the alert target object that needs to be avoided, in response to determining that the different vehicle needs to avoid the alert target object.

3. The alert output apparatus according to claim 1, wherein the processor is further configured to:

read out a usual vehicle travel data indicating a usual vehicle travel behavior from a usual travel database; and detect an avoidance action arising in each of the vehicles by comparing the read usual vehicle travel data with the travel behavior of each of the vehicles.

4. The alert output apparatus according to claim 1, wherein the processor is further configured to receive an alert report data including information on position and clock time from any one of the plurality of vehicles; and record in the alert target database an alert target data indicating a position change of an alert target object based on the received alert report data.

5. A method implemented by at least one processor, the method comprising:

receiving, from each of a plurality of in-vehicle units mounted individually in a plurality of vehicles, a travel behavior data indicating a travel behavior of the vehicle in which each of the in-vehicle units is mounted, to record the travel behavior data in a travel history database;

reading a travel behavior data indicating a travel behavior of each of the vehicles to detect an avoidance action arising in each of the vehicles based on the read travel behavior data;

extracting, from the avoidance actions of the vehicles, peripheral avoidance actions that arise within a predetermined position range within a predetermined time range based on an occurrence position and an occurrence point of time of each of the avoidance actions of the vehicles;

mapping the extracted peripheral avoidance actions on a road map to extract a group of avoidance actions that arise on an identical road based on the peripheral avoidance actions mapped on the road map as a related avoidance action group being a plurality of avoidance actions arising due to an identical object at different positions at different points of times in different target vehicles included in the plurality of vehicles; and recording information on a position change of the identical object that serves as a cause of the extracted related avoidance action group, as an alert target data indicating a position change of an alert target object in an alert target database.

* * * * *